United States Patent
Yadav et al.

(10) Patent No.: US 8,825,668 B2
(45) Date of Patent: Sep. 2, 2014

(54) METHOD AND APPARATUS FOR UPDATING SONG PLAYLISTS BASED ON RECEIVED USER RATINGS

(75) Inventors: Rakesh Yadav, Mountain View, CA (US); Amit Khanna, Mountain View, CA (US); Ajit Apte, Mountain View, CA (US)

(73) Assignee: Google Inc., Mountain View, CA (US)

( * ) Notice: Subject to any disclaimer, the term of this patent is extended or adjusted under 35 U.S.C. 154(b) by 136 days.

(21) Appl. No.: 13/297,694

(22) Filed: Nov. 16, 2011

(65) Prior Publication Data

US 2013/0124533 A1    May 16, 2013

(51) Int. Cl.
*G06F 17/30* (2006.01)

(52) U.S. Cl.
CPC ............ *G06F 17/30* (2013.01); *Y10S 707/916* (2013.01)
USPC ................. 707/748; 707/804; 707/E17.113; 707/916; 707/E17.009

(58) Field of Classification Search
CPC ................... G06F 17/30864; G06F 17/30867; G06F 17/30752; G06F 17/3053; G06Q 30/02; H04N 21/4825; H04N 21/26258; Y10S 707/99932
USPC ........... 707/748, 804, 916, 999.007, 999.102, 707/E17.113, E17.009
See application file for complete search history.

(56) References Cited

U.S. PATENT DOCUMENTS

| | | | |
|---|---|---|---|
| 7,515,873 B2 * | 4/2009 | Brown et al. ................. | 455/3.01 |
| 7,711,838 B1 * | 5/2010 | Boulter et al. ................ | 709/231 |
| 7,716,245 B2 * | 5/2010 | Omae et al. .................. | 707/787 |
| 7,725,494 B2 * | 5/2010 | Rogers et al. ................. | 707/802 |
| 7,840,563 B2 * | 11/2010 | Powers et al. ................. | 707/736 |
| 7,962,482 B2 * | 6/2011 | Handman et al. ............. | 707/733 |
| 7,970,922 B2 * | 6/2011 | Svendsen ....................... | 709/231 |
| 7,985,911 B2 * | 7/2011 | Oppenheimer ................ | 84/600 |
| 8,005,856 B2 * | 8/2011 | Spitzer-Williams et al. . | 707/769 |
| 8,095,555 B2 * | 1/2012 | Wakasa et al. ................ | 707/770 |
| 8,107,327 B2 * | 1/2012 | Yamashita et al. ........ | 369/30.38 |
| 8,117,545 B2 * | 2/2012 | Rosenbaum et al. ......... | 715/719 |
| 8,175,529 B2 * | 5/2012 | Wakasa et al. ............... | 455/41.2 |
| 8,224,856 B2 * | 7/2012 | Purdy ............................ | 707/791 |
| 8,255,464 B2 * | 8/2012 | Wilkins ........................ | 709/206 |
| 8,285,674 B2 * | 10/2012 | Landry et al. ................ | 707/620 |
| 8,457,661 B2 * | 6/2013 | Rossano et al. .............. | 455/466 |

(Continued)

OTHER PUBLICATIONS

Wikipedia, "QR code", 2013, 16 pages, accessed online at <http://en.wikipedia.org/wiki/QR_code> on Sep. 3, 2013.*

(Continued)

*Primary Examiner* — Phuong Thao Cao (74) *Attorney, Agent, or Firm* — Morris & Kamlay LLP (57) ABSTRACT

Methods, apparatuses, and computer programs are presented for updating song playlists based on received rating inputs from user devices. One method includes receiving information associated with songs in an initial playlist from a host device by a server. The server generates a rating interface for the initial playlist, which is associated with an image code. The image code for the rating interface is sent to the host device so that the user devices can access the rating interface via the image code. After one or more user devices provides rating inputs to the songs in the initial playlist, the received one or more rating inputs are analyzed to produce an adjusted playlist. The method further includes transmitting the adjusted playlist to the host device to be executed.

20 Claims, 6 Drawing Sheets

(56) References Cited

U.S. PATENT DOCUMENTS

| | | | |
|---|---|---|---|
| 8,632,013 B2* | 1/2014 | Cok et al. | 235/472.01 |
| 2004/0123725 A1* | 7/2004 | Kim | 84/609 |
| 2005/0160111 A1* | 7/2005 | Plastina et al. | 707/102 |
| 2006/0143236 A1* | 6/2006 | Wu | 707/104.1 |
| 2006/0161621 A1 | 7/2006 | Rosenberg | |
| 2006/0171535 A1* | 8/2006 | Omae et al. | 380/201 |
| 2006/0195480 A1* | 8/2006 | Spiegelman et al. | 707/104.1 |
| 2006/0212444 A1* | 9/2006 | Handman et al. | 707/5 |
| 2006/0239131 A1* | 10/2006 | Nathan et al. | 369/30.06 |
| 2006/0265421 A1* | 11/2006 | Ranasinghe et al. | 707/104.1 |
| 2007/0014536 A1* | 1/2007 | Hellman | 386/94 |
| 2007/0122061 A1* | 5/2007 | Sakuta et al. | 382/300 |
| 2007/0174147 A1* | 7/2007 | Klein, Jr. | 705/28 |
| 2008/0086422 A1* | 4/2008 | Wolff et al. | 705/50 |
| 2008/0177549 A1* | 7/2008 | Brown et al. | 704/270 |
| 2008/0301173 A1* | 12/2008 | Ryu et al. | 707/102 |
| 2008/0301187 A1* | 12/2008 | Svendsen | 707/104.1 |
| 2008/0319833 A1* | 12/2008 | Svendsen | 705/10 |
| 2009/0031336 A1 | 1/2009 | Chavez et al. | |
| 2009/0043783 A1* | 2/2009 | Wakasa et al. | 707/10 |
| 2009/0046101 A1* | 2/2009 | Askey et al. | 345/470 |
| 2009/0049045 A1* | 2/2009 | Askey et al. | 707/7 |
| 2009/0055396 A1* | 2/2009 | Svendsen et al. | 707/7 |
| 2009/0055426 A1* | 2/2009 | Kalasapur et al. | 707/102 |
| 2009/0063292 A1* | 3/2009 | Cole et al. | 705/26 |
| 2009/0063511 A1* | 3/2009 | Myers et al. | 707/10 |
| 2009/0063976 A1* | 3/2009 | Bull et al. | 715/716 |
| 2009/0089327 A1* | 4/2009 | Kalaboukis et al. | 707/104.1 |
| 2009/0089401 A1 | 4/2009 | Zhang et al. | |
| 2009/0157530 A1* | 6/2009 | Nagamoto et al. | 705/27 |
| 2009/0300106 A1* | 12/2009 | Woodside et al. | 709/203 |
| 2009/0327222 A1* | 12/2009 | Spitzer-Williams et al. | 707/3 |
| 2010/0010997 A1* | 1/2010 | Amidon et al. | 707/7 |
| 2010/0070862 A1* | 3/2010 | Partovi et al. | 715/716 |
| 2010/0114968 A1 | 5/2010 | Dean | |
| 2010/0134385 A1* | 6/2010 | Roth et al. | 345/2.3 |
| 2010/0162324 A1* | 6/2010 | Mehta et al. | 725/61 |
| 2010/0205166 A1* | 8/2010 | Boulter et al. | 707/705 |
| 2010/0228740 A1* | 9/2010 | Cannistraro et al. | 707/748 |
| 2010/0250463 A1 | 9/2010 | O'Rourke et al. | |
| 2010/0255772 A1* | 10/2010 | Hellman | 455/3.06 |
| 2010/0324704 A1 | 12/2010 | Murphy et al. | |
| 2011/0178863 A1* | 7/2011 | Daigle | 705/14.31 |
| 2011/0213769 A1* | 9/2011 | Handman et al. | 707/722 |
| 2011/0238779 A1* | 9/2011 | Little et al. | 709/217 |
| 2011/0271189 A1* | 11/2011 | Myers et al. | 715/716 |
| 2011/0282734 A1 | 11/2011 | Zurada | |
| 2012/0085829 A1* | 4/2012 | Ziegler | 235/493 |
| 2012/0125995 A1* | 5/2012 | Kim | 235/375 |
| 2012/0198354 A1* | 8/2012 | Wakasa et al. | 715/748 |
| 2012/0325901 A1* | 12/2012 | Ross | 235/375 |
| 2012/0327265 A1* | 12/2012 | Arujunan et al. | 348/231.3 |
| 2013/0086519 A1* | 4/2013 | Fino | 715/810 |
| 2013/0191180 A1* | 7/2013 | Teo et al. | 705/7.32 |

OTHER PUBLICATIONS

Drews et al., "Virtual Jukebox", In Proceedings of the 35th Hawaii International Conference on System Sciences, IEEE, 2002, 7 pages.*

An IP.com Prior Art Database Technical Disclosure, "User Interface Forwarded to a Smart Phone, Based on a Camera Image", published on Nov. 30, 2011, 2 pages, accessed online at <http://ip.com/pdf/ipcompad/IPCOM000212839D.pdf> on May 5, 2014.*

Pauws et al., "PATS: Realization and User Evaluation of an Automatic Playlist Generator", In Proceedings of the 3rd International Conference on Music Information Retrieval, Oct. 13-17, 2002, 9 pages.*

Das et al., "An Interactive System Using Digital Broadcasting and Quick Response Code", In IEEE 15th International Symposium on Consumer Electronics, 2011, pp. 397-400.*

PCT International Search Report and Written Opinion of the International Searching Authority (ISA) issued in International Application No. PCT/US2012/063441, United States Patent and Trademark Office, Mar. 25, 2013.

\* cited by examiner

Rating Interface for User A

| Name | Current Rating | Social Network Rating Information | User Rating Input | |
|---|---|---|---|---|
| Song A | 1 | • User G's Rating:2<br>• User H's Rating:3 | 3 | ← User Input Field For Song A |
| Song B | 2 | | 2 | ← User Input Field For Song B |
| Song C | 3 | • User G's Rating:1<br>• User H's Comments:<br>...... | 1 | ← User Input Field For Song C |
| Song D | 4 | • User H's Comments:<br>• User G's Rating:5<br>...... | 5 | ← User Input Field For Song D |
| Song E | 5 | | 4 | ← User Input Field For Song E |

METHOD AND APPARATUS FOR UPDATING SONG PLAYLISTS BASED ON RECEIVED USER RATINGS

BACKGROUND

Internet applications have grown tremendously over the years and so has the functionality provided to devices that access those applications. One area that has seen such growth relates to audio file management.

A song playlist usually includes a plurality of song names and a playing order of the songs in the song playlist. The song playlist is usually defined by a user by selecting one or more groups of songs from a digital music library. A host of a party can chose a plurality of songs for a song playlist and pick the playing order of the songs. However, it is difficult for the host of a party to find out the type of music his party guests will like to hear, especially for a large number of party guests. Additionally, music libraries and the defined playlists are personal to the user that purchased the songs and access to music and selection of songs of other users is not commonly possible.

It is in this context that embodiments of the disclosure arise.

SUMMARY

Embodiments of the present disclosure provide methods, apparatuses, and computer programs for updating song playlists based on received user ratings. In one embodiment, user ratings are received from users based on their personal preferences, when such users attend an event. At the event, for example, the users are provided with a code for accessing an online interface. The online interface receives ratings from the various users, and based on analysis performed on the received ratings, a server acts to transmit instructions to update the order of songs of a playlist. In one example, the playlist is managed by a computing device of a user. The user managing the computing device having the playlist may, for example, be the host, arranger, or person that has access to create, modify, define or setup the playlist for the event. The computing device will, in one embodiment, receive the instructions from the server connected to the internet, and the instructions may cause the order of the playlist to change based on the analyzed user ratings. It should be appreciated that the present disclosure can be implemented in numerous ways, such as a process, an apparatus, a system, a device or a method on a computer readable medium. Several inventive embodiments of the present disclosure are described below.

In one embodiment, a method for updating song playlists based on received user ratings includes receiving information associated with songs in an initial playlist from a host device. Based on the received information, a rating interface for the initial playlist is generated and the generated rating interface is associated with an image code. The image code for the rating interface is sent to the host device. After the user devices access the rating interface through the image code, the user devices may provide one or more rating inputs. The received one or more rating inputs are analyzed for producing an adjusted playlist. The adjusted playlist is then transmitted to the host device so that the songs in the adjusted playlist may be played. The disclosed method is executed by a processor.

In another embodiment, an apparatus for updating song playlists based on received user ratings is disclosed. The apparatus includes an information receiving module, an interface generating module, an information transmitting module, a user input receiving module, and an analyzing module. At least one processor is configured to execute the information receiving module, the interface generating module, the information transmitting module, the user input receiving module, and the analyzing module. The information receiving module is programmed to receive information associated with the songs in an initial playlist from a host device. The interface generating module is programmed to generate a rating interface for the initial playlist and the generated rating interface is associated with an image code. The user input receiving module is programmed to receive one or more rating inputs from the user devices after the user devices provides rating inputs to songs in the initial playlist. The user devices access the rating interface through the image code. The information transmitting module is programmed to transmit image code to the host device. The analyzing module is programmed to analyze the received one or more rating inputs from the user devices and to produce an adjusted playlist accordingly. The information transmitting module is further programmed to transmit the adjusted playlist to the host device so that the songs in the adjusted playlist may be played by the host device.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

DETAILED DESCRIPTION

The following embodiments describe methods, computer programs, and apparatus for updating song playlists based on received user rating inputs. The disclosed method includes receiving information associated with songs in an initial playlist from a host device, generating a rating interface for the initial playlist along with an associated image code, and sending the image code for the rating interface to the host device. The disclosed method further includes receiving one or more rating inputs from user devices after the user devices access the rating interface via the image code, and analyzing the received one or more rating inputs from the user devices to produce an adjusted playlist. In one embodiment, the disclosed method comprises transmitting the adjusted playlist to the host device to be played. The disclosed method is executed by a processor.

In accordance with one embodiment, the apparatus for updating song playlists based on received user ratings includes an information receiving module programmed to receive information associated with songs in an initial playlist from a host device, an interface generating module programmed to generate a rating interface for the initial playlist, the rating interface being associated with an image code, an information transmitting module programmed to send the image code for the rating interface to the host device. The apparatus further includes a user input receiving module programmed to receive one or more rating inputs from user devices that provide the rating inputs after accessing the rating interface through the image code, and an analyzing module programmed to analyze the received one or more rating inputs from the user devices so that an adjusted playlist may be produced. The information transmitting module is further programmed to transmit the adjusted playlist to the host device to be played by the host device.

Figure 1:
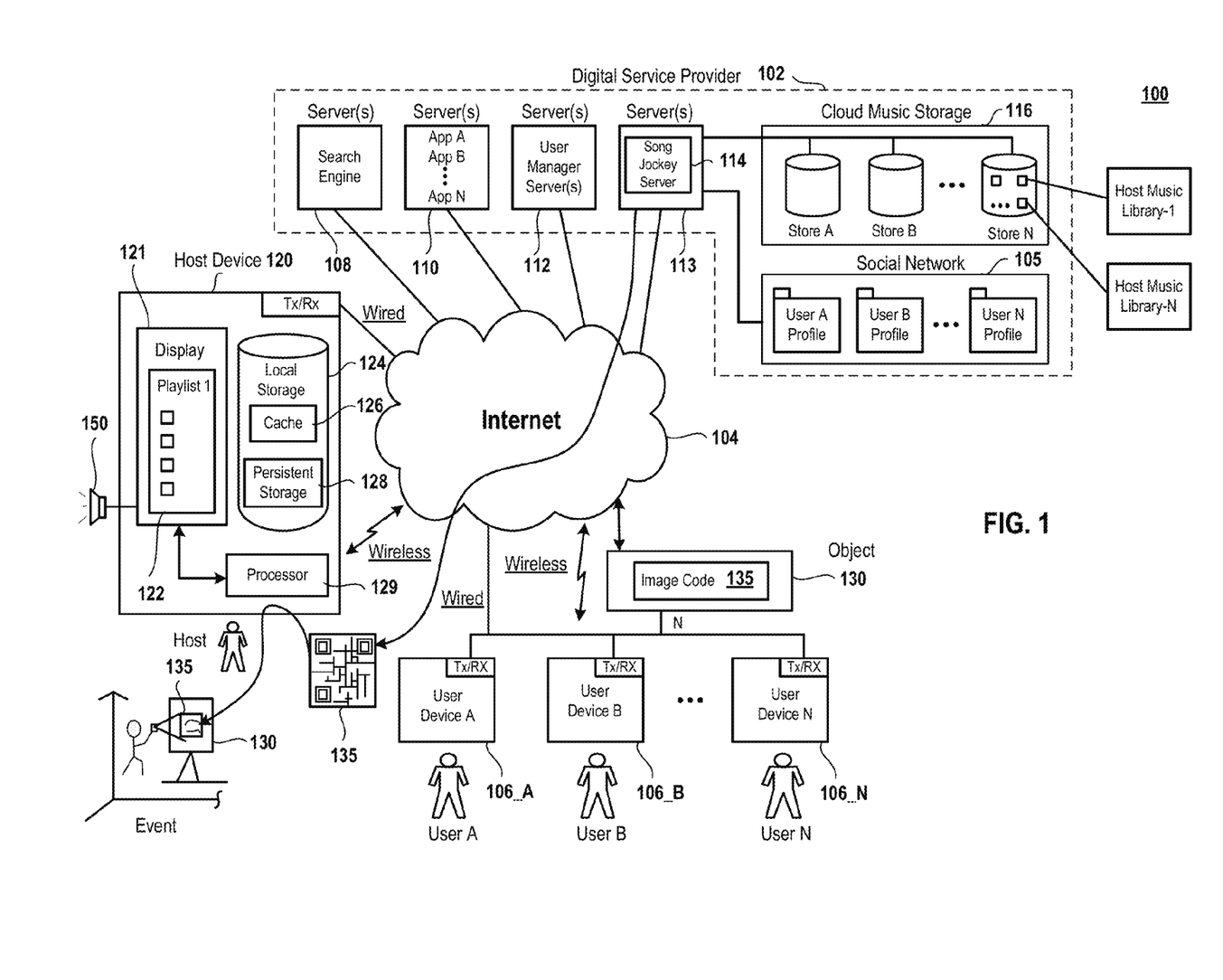
FIG. 1 illustrates a system that defines a method for updating song playlists based on received user ratings, in accordance with one embodiment of the present disclosure.

FIG. 1 illustrates a system 100 that defines a method for updating song playlists based on received user rating inputs, in accordance with one embodiment of the present disclosure. The system 100 includes a plurality of servers that are connected to the Internet 104. The plurality of servers and storage are, in one embodiment, part of a digital service provider 102. The digital service provider 102 is a system that can include one or a plurality of servers that can provide applications, services, digital content, and interconnectivity between systems, applications, users, and social networks. For example, the digital service provider 102 can include a search engine 108, a plurality of servers 110 that provide applications for various businesses, social, and technology related subject matter, servers that provide user management 112, and servers to provide music related services 113.

One example digital service provider 102 can be Google, Inc., of Mountain View Calif. Other digital service providers can be more focused to provide only specific services, while others provide a variety of services for access, download, viewing, searching, etc. The content can vary greatly, but is commonly presented in digital format and displayed on monitors or screens of devices, computers, smart phones, tablets, etc.

One of the servers 113 that provide music related services, in one embodiment, is illustrated by song jockey server (SJS) 114, which is connected to the Internet 104. The SJS 114 is shown connected to cloud music storage 116 and the social network 105. Cloud music storage 116 is shown to include a plurality of storage systems, identified as store A, store B, and store N. The various storage systems that hold music data and music metadata are provided with access to the Internet, for providing music data on demand to users requiring access to their music library stored in cloud music storage 116. In one embodiment, hosts or users can access the cloud music storage 116 by way of the host device 120 or a plurality of user devices 106_A to 106N. The host device and the plurality of user devices can include any type of device having a processor and memory, wired or wireless, portable or not portable. In the example illustrated in FIG. 1, user A is shown to have a user device 106_A. The user device 106_A is shown to include communication logic (Tx/Rx) for transmitting and receiving data between the user device and the Internet 104. The communication logic (Tx/Rx) can include various types of network interface circuitry, radio-communication (e.g. wireless), cell tower communication, or interconnected wiring connected to Internet service providers.

As illustrated, the host in FIG. 1 is shown to have a host device 120 that includes communication logic (Tx/Rx) for transmitting and receiving data between the host device 120 and the Internet 104. The host device 120 includes a display having a screen 121, local storage 124, and a processor 129. Local storage 124 can include cache memory 126, persistent storage 128, and other logic. In this example, the host device 120 is shown to include graphical icons (e.g., graphical user interfaces GUIs) that represent a play list 122, where the songs of the playlist 122 may be played via a music playing device 150. The screen 121 can be a touch-screen, or a display typically provided by a flat-panel display, a cathode ray tube (CRT), or other media capable of rendering a display. Still further, the host device 120 may have its display separate from the device, similar to a desktop computer or a laptop computer. Still further yet, the host device 120 can be in the form of a smart phone, a tablet computer, or hybrids that provide touch screen capability in a portable form factor. One example device can include a portable phone device that runs an operating system and is provided with access to various applications (apps) that may be obtained over the Internet, and executed on the local portable device (e.g., smart phone, tablet, laptop, desktop, etc.).

In one embodiment, a user may utilize a host device 120, which has a locally stored music library. The user can define particular playlists for a particular event, and upload the playlists to the digital service provider 102, where the song jockey server 114 can generate an image code 135 for the playlist received from the user. The image code 135 is then sent to the user (host), so that the user can post the image code at the event. In one example, the event is a party where a plurality of users will attend, and the host intends to provide the users with an interface that allows them to vote on the music being played at the event. The host may, for example, post the image code 135 on an object 130 at the event, so that the invited users can capture the image code 135 with an image capture device connected to the Internet, and be presented with a user rating interface. The image capture device may be, for example, a camera of a smart phone.

The user rating interface will present the users with the current playlist of music being played at the event, and will allow the users to provide rating inputs for the various songs in the playlist. This rating input will be utilized by the song jockey server 114 to adjust the playlist based on the votes received from the various users at the event. The song jockey server 114 will therefore create an updated playlist that is transmitted back to the host device 120. The host device 120 will then use the updated playlist to change the order in which the songs in the playlist are being played. In this example, the songs are all being played from the host device 120, and its local storage of digital music.

The song jockey server, in this embodiment, is simply receiving an initial playlist from the host device 120, and feedback regarding rating information from the attendees of the event, and adjusting the playlist. The adjusted playlist is then transmitted back to the host device 120. The music selection is therefore modified by the host device 120, which is playing the music from its local storage 124. From time to time, as more votes are received by the song jockey server 114, further adjustments to the playlist are made and retransmitted back to the host device 120. Accordingly, as the preferences at the event change over time, users at the event will influence which songs in the playlist will be played by the host device 120 during the event.

In another embodiment, the host (i.e., a user) can install an application, in the host device 120 that provides access to the music files of music libraries in cloud music storage 116.

Once the host's music files are uploaded, transferred or saved to the cloud music storage 116, the host's music files can be associated to a music library of the host. Although only one host is illustrated in FIG. 1, it is to be understood that any number of users can interact with the SJS 114 to upload their own music files to create their own music libraries in the cloud music storage 116. Additionally, users can also purchase music online and add the purchased music to the user's music library directly. In this embodiment, this transfer from the entity selling the music can be made as a cloud transfer, without requiring download to a user's device.

Once the music libraries are setup, users can access the cloud music storage 116 through an application on their computing devices. In this example, the user may be the host of an event or gathering. Thus, the user is referred to as the "host," and thus, the host device 120 is utilized by the host. In this embodiment, the host device 120 can render and play selected music files on the host device 120, when the host device 120 has access to the Internet, the associated SJS 114, and cloud music storage 116. Accordingly, the host can access the music application on the host device 120, access all music files stored in cloud music storage 116, arrange music titles in their music library into playlists, add music to the cloud music storage 116, delete music from the cloud music storage 116, and purchase music that is added to the cloud music storage 116. In one embodiment, these changes can be maintained and managed by the SJS 114 that will provide access to the various hosts or users to access their music files stored in the cloud music storage 116, based on their selections during use of the application.

In one embodiment, after the host device 120 uploads the information associated with the songs in an initial playlist to the SJS 114, the SJS 114 will generate a rating interface along with an associated image code 135, which can be sent to the user or downloaded by the host. The host may make the image code available to the users so that a user can access the rating interface and provide rating inputs to one or more songs in the initial playlist. In one embodiment, the image code 135 can be printed out by the host and made it available to a group of users.

In one embodiment, the group of users may be a group gathered at an event, such as a party. At the party location, the host of the party may utilize copies of the printed image code 135, and post them up at one or more viewable locations at the event (e.g., object 130). For example, if the event is taking place at the host's house, the image code 135 can be posted onto a wall, a poster board, a door, a kitchen appliance, etc. If the event takes place at a night club, the host will be the owner or operator of the night club. The host can then post a print out of the image code on walls of the club, on paper pamphlets, on napkins, on menus, on display screens, etc. In general, the posting of the image code 135 can occur in any number of ways, so long as other users can see the image code 135, and the image code can be captured or used by the other users.

In one embodiment, the SJS 114 has access to a social network 105 that maintains various social network profiles for the host or the users. This is illustrated, for example, as user A profile, user B profile, . . . user N profile. In one embodiment, when a user accesses the rating interface generated by the SJS 114 based on the uploaded information associated with the songs in a playlist from the host device, the user rating interface may also integrate social network rating information. In this manner, users can obtain information regarding rating, opinions, comments, etc., which may have been made by a user's social connections. The social network rating information includes, but not limited to, song rating inputs by a user's social network friends, associated rating input weights assigned to social network friends, or comments made by the user's social network friends or comments from particular groups of friends.

Figure 2:
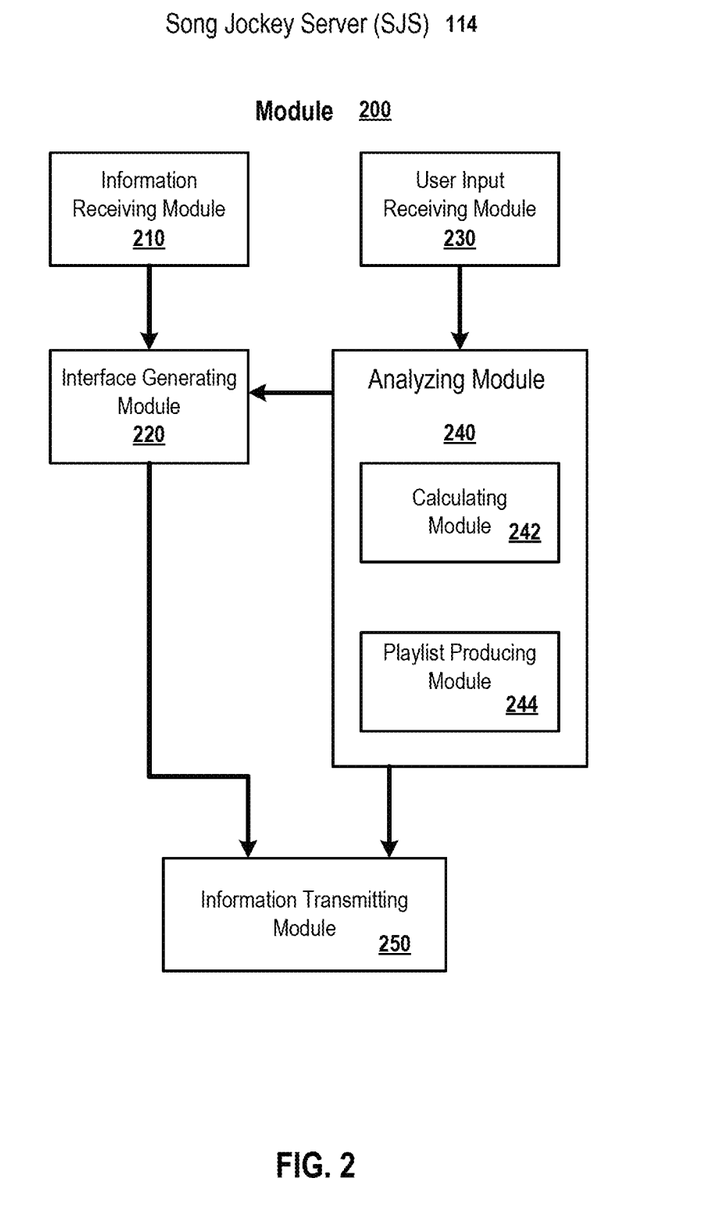
FIG. 2 illustrates a song jockey server (SJS) utilized for updating song playlists based on received user ratings, in accordance with one embodiment of the present disclosure.

FIG. 2 illustrates a song jockey server (SJS) utilized for updating song playlists based on received user ratings, in accordance with one embodiment of the present disclosure. As illustrated in this figure, the SJS 114 may include one or more modules 200 for preforming one or more tasks. In certain embodiments, one or more of modules 200 in FIG. 2 may be part of other software components, may represent one or more software applications or programs, parts of programs, or code executed by one or more servers. In one embodiment, when executed by a computer device, the code of the modules will cause a processor to execute one or more logical functions.

As shown in FIG. 2, module 200 of the SJS 114 includes an information receiving module 210, an interface generating module 220, a user input receiving module 230, an analyzing module 240, and an information transmitting module 250.

The information receiving module 210 may be programmed to receive information associated with the songs in an initial playlist from a host device. The initial playlist identifies a playing order for the songs as defined at the host device. The information associated with the songs, for example, may be the songs, metadata associated with the songs, or names of the songs in the initial playlist. The information associated with the songs in the initial playlist may be uploaded to the SJS 114 from the local storage 124 in the host device 120. Alternatively, the information associated with the songs in the initial playlist may be received from one of the music libraries stored in the cloud music storage 116.

After receiving the information associated with the songs in the initial playlist from the host device by the information receiving module 210, the interface generating module 220 may be programmed to generate a rating interface for the initial playlist. The rating interface, which will be explained in more detail with reference to FIG. 3, may be associated with an image code. For example, a unique image code can be produced for each event, and the rating interface for the event will be tied or linked to the image code 135. In one embodiment, the image code 135 is a printable pattern that is image recognizable. The image code 135 can also be displayed on a display screen. For example, the image code 135 may be image recognizable by a camera of a smartphone, and the smartphone will automatically access a link or site on the internet in response to recognizing distinguishing data of the image code. For example, upon detecting the image code 135, the smartphone may access a link to a website that displays the rating interface. The rating interface is, in one embodiment, a user interface that is rendered on the display of the accessing device. If the accessing device is a smartphone, the user interface can be in the form of text and graphics that are user selectable. In another embodiment, the rating interface may also be accessed in response to voice commands. That is, instead of detecting the image code using the smartphone, the user can access an application on his smartphone or computer and then speak a particular phrase or name. The application can then utilize voice recognition to then access the rating interface. The rating interface can also receive voice input.

Continuing with FIG. 2, the information transmitting module 250 may be programmed to send the image code 135 for accessing the rating interface to the host device 120. Upon receiving the image code by the host device, the host can print out the image code or make the image code accessible to the public or a selected group of users via other means. Users can then access the rating interface in the SJS 114 via the image code through their user devices to provide rating inputs regarding the songs in the initial playlist.

The user input receiving module 230 may be programmed to receive one or more rating inputs from the user devices and pass the received user rating inputs to the analyzing module 240. The one or more rating inputs from the user devices include defining a new order for the songs in the initial playlist. In one embodiment, the user input receiving module 210 may also be programmed to receive social network rating information.

The analyzing module 240 may be programmed to analyze the received one or more rating inputs from the user devices. Once the analyzing module 240 has determined that the playing order of the initial playlist has been changed based on the received one or more rating inputs from the user devices, the analyzing module 240 may be programmed to produce an adjusted playlist with the new playing order and to update the rating interface generated by the user interface generating module 220. The rating interface update imitated by the analyzing module 240 occurs over time or after a threshold of rating inputs are received.

The analyzing module 240 may include a calculating module 242 to be programmed to calculate a score for each of the songs in the initial playlist based on the rating inputs received from two or more user devices. In one embodiment, the calculating module 242 of the analyzing module 240 may be programmed to assign a weight to a user device so that the rating input from that a user device is given more or less significance, as compared to other rating inputs from other user device. In one embodiment, the weight assigned to the user device can be determined based on a fee paid by the user when providing the rating inputs. Thus, if a particular user wishes to influence the order of songs being played more heavily than other users at an event, that user can pay a fee to increase the weighting assigned to his or her ratings. This embodiment may assist users that attend a public event, such as a night club, to better influence the music selection. In another embodiment, certain users can be given more weighting based on their importance, as determined by the host. For instance, for particular gatherings, certain guests may be assigned more weight to their input ratings based on their celebrity status, frequent user status, etc. In one embodiment, the weight assigned to a particular user can be utilized to produce an adjusted playlist immediately, upon receiving the rating inputs from the user.

The analyzing module 240 may include a playlist producing module 244 to be programmed to produce an adjusted playlist based on the received user rating inputs. The adjusted playlist identifies a change to the order for the songs which were originally defined at the host device by the host (i.e., initial playlist). The information transmitting module 250 may be further programmed to transmit the adjusted playlist to the host device. Upon receiving the adjusted playlist, the host device may play the songs according to the playing order of the songs in the adjusted playlist.

In one embodiment, the host device 120 is the device utilized to play the songs of the playlists at the event, location, party, etc. The host device, as noted above, can be any computing device that has access to the internet and has the capability to output sound. The sound can be output through speakers of the host device or can be the speakers of a larger system connecting to the host device. If the host device 120 is a smartphone, the smartphone can be connected to an audio receiver or a set of speakers. If the host device 120 is a computer, the computer can utilize its speakers or it can utilize speakers of a receiver. The receiver can be a home audio receiver, a commercial receiver, or any device that can output sound. The sound, in this embodiment, is the sound of the songs of the playlist(s).

In one embodiment, the playlist producing module 244 may also be programmed to determine a song currently playing by the host device and a next song to play as identified in the adjusted playlist. If the song currently playing by the host device is the same as the next song to play in the adjusted playlist, the playlist producing module 244 may be programmed to skip the next song in the identified playlist to avoid a song to be played repeatedly. In another embodiment, the same song can be played any number of times. Thresholds can also be defined to allow playing of the same song only a number of times before requiring skipping to a next song.

The user input receiving module 230 may be further programmed to continuously receive the one or more rating inputs from the user devices over time, and the one or more rating inputs cause the analyzing module 240 to continuously modify the adjusted playlist.

Figure 3:
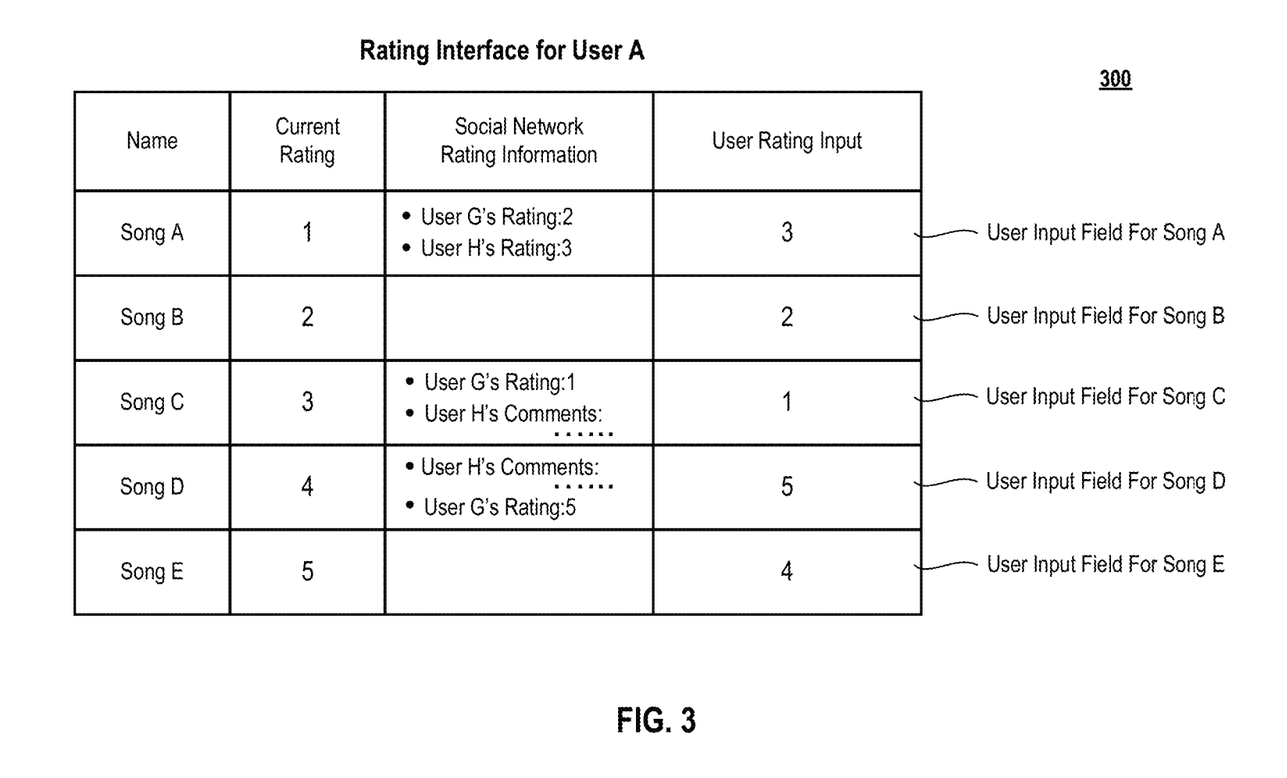
FIG. 3 illustrates an exemplary user rating interface (for user A) generated by a song jockey server (SJS) for displaying and receiving user rating inputs for the songs in a playlist, in accordance with one embodiment of the present disclosure.

FIG. 3 illustrates an exemplary user rating interface (for user A) generated by a song jockey server (SJS) for displaying and receiving rating inputs, in accordance with one embodiment of the present disclosure.

By way of example, the rating interface 300 may include four columns, with one name column showing the names of the songs of an initial or current playlist, one current rating column showing the current song rating information, one social network rating information column showing the song ratings and/or comments made by user A's social network friends, and one user rating input column showing and receiving the rating inputs from user A. In one embodiment, the data shown in the rows for songs A to E and the user rating input column are user input fields. The user input can be freely entered text or comments, or can be fixed selection options. For example, the selection options can be in the form of drop down menus, which allow the user to select 1-5, where 1 is a top rating and 5 is a low rating, etc. Other embodiments can include radio buttons, toggle interfaces, voice input, sounds, tapping intensity, etc. In general, the input provides the rating information for the songs in the playlist(s), based on the personal preferences of the users. The format of the interface can take on any format, so long as the user can provide his or her rating feedback.

In this embodiment, users G and H, who are user A's social network friends, have rated or commented for songs A, C, and D, which are shown in FIG. 3.

Figure 4:
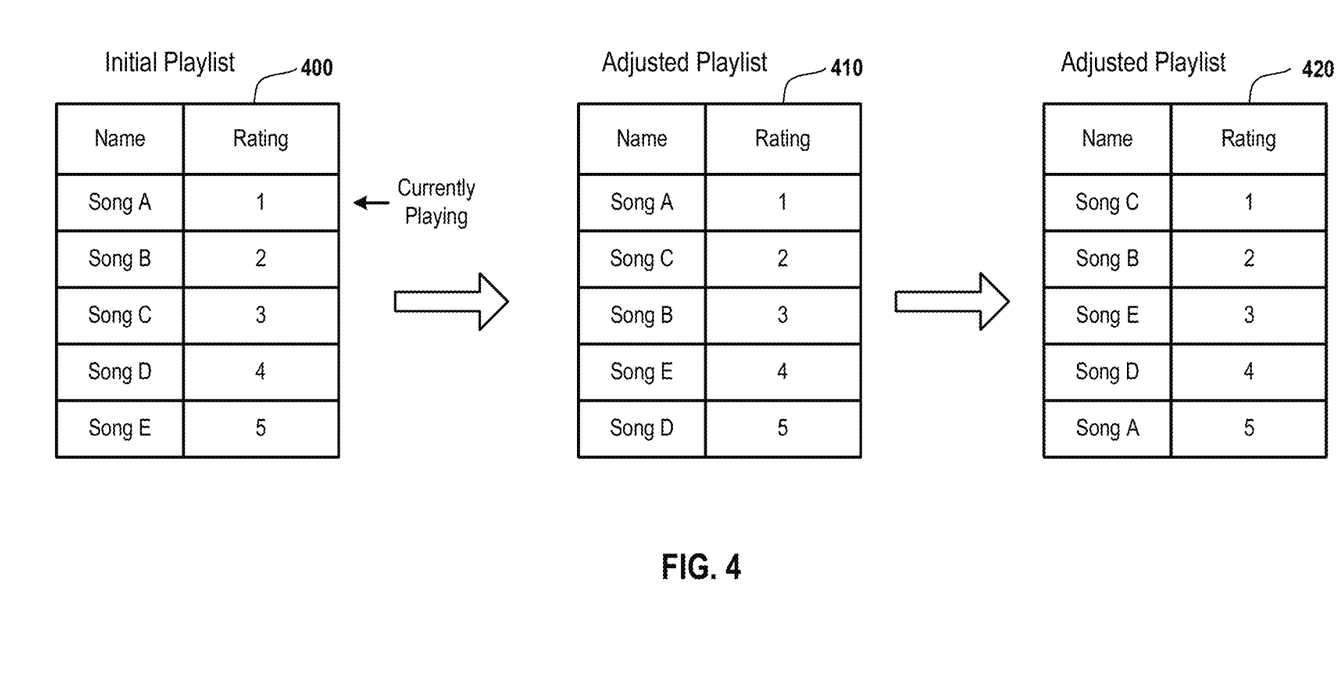
FIG. 4 illustrates an exemplary initial song playlist received by a song jockey server (SJS) and two adjusted song playlists resulted from the modification of the initial playlist based on the received user rating inputs, in accordance with one embodiment of the present disclosure.

FIG. 4 illustrates an exemplary initial song playlist received by a song jockey server (SJS) and two adjusted song playlists resulted from the modification of the initial playlist based on the received user rating inputs, in according with one embodiment of the present disclosure.

The exemplary initial playlist 400 and the adjusted playlists 410 and 420 show the song names along with the rating information. Song A in the initial playlist 400 is currently being played by a host device. The adjusted playlist 410 is produced, after a pre-determined time interval, based on the user rating inputs received from user devices during the pre-determined time interval. The adjusted playlist 410 is updated based on the modification for the initial playlist 400. As shown in FIG. 4, song A is also the highest rated song in the adjusted playlist 410. In one embodiment, to avoid song A is being played repeatedly, the adjusted playlist 410 may be adjusted again to produce the adjusted playlist 420. In this embodiment, song A is placed at the bottom of the adjusted playlist 420. Alternatively, song A could be placed at a pre-determined number of songs after the highest rated song, for example, 2 songs after song C, in the adjusted playlist 420.

Figure 5:
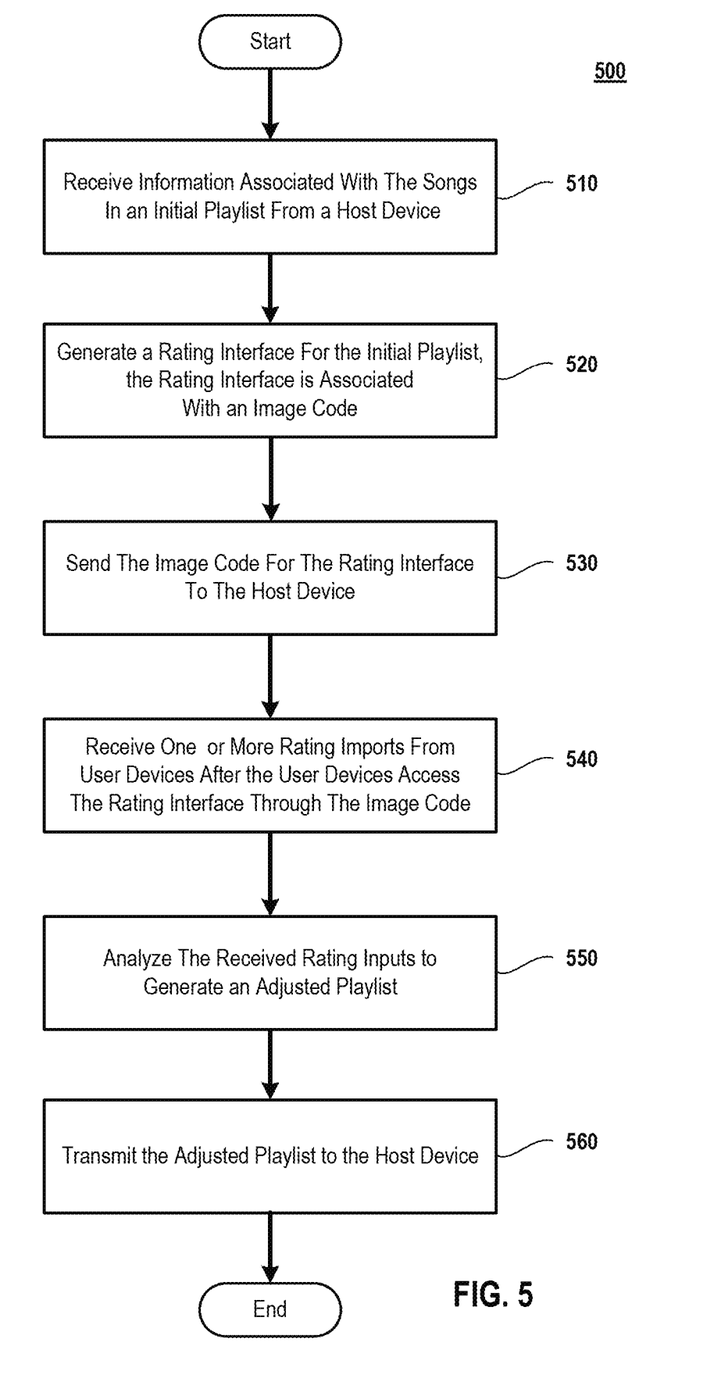
FIG. 5 illustrates a flow diagram of an example method for updating song playlists based on received user rating inputs, in accordance with one embodiment of the present disclosure.

FIG. 5 illustrates a flow diagram of an exemplary method for updating song playlists based on received user ratings, in accordance with one embodiment of the present disclosure. In one embodiment, the illustrated method 500 is described in relation to operations performed by the song jockey server (SJS) 114 of the servers 113 in the digital service provider 102, as shown in FIG. 1. As used herein, the term "song jockey" is used to connote a system that can change the order of a playlist based on received rating input from one or more users. As such, so long as the functionality is provided, the name song jockey and SJS are only used for purposes of explaining the functional aspects of the embodiments. Furthermore, the code that enables the functionality can be integrated with code of other modules, systems, services, etc., or can be operated as a separate module or service. For example purposes, the servers 113 of the digital service provider 102 can execute code of one or more applications that enable the processes provided by the SJS 114, and access to the cloud music storage 116 and social network 105 that are made available by the digital service provider 102.

In operation 510, the information associated with the songs in an initial playlist is received from a host device. In one embodiment, the information associated with the songs is received by a song jockey server, such as the SJS 114 shown in FIG. 1 and FIG. 2. The received information may be the songs or metadata of the songs in the initial playlist along with the playing order or song ratings of the songs in the initial playlist. Alternatively, the received information could be names of the songs and playing order of the songs in the initial playlist. The operation 510 may be performed by the information receiving module 210 of the SJS 114 shown in FIG. 2.

In operation 520, a rating interface is generated for the initial playlist after the information associated with the songs in the initial playlist is received. The rating interface may be associated with an image code that can be used by user devices to access the rating interface. In one embodiment, the image code is a printable pattern, such as a QR code, which is image recognizable and is configured to access a link to a website that displays the rating interface. In another embodiment, the image code is a website link to be used to access the website that displays the rating interface. Alternatively, the image code is a name associated with the rating interface. After a user pronounces the name associated with the rating interface, voice recognition software will direct the user to the website that displays the rating interface. In one embodiment, the operation 520 may be performed by the user interface generating module 220 of the SJS 114 shown in FIG. 2.

In operation 530, the image code associated with the rating interface is sent from the SJS to the host device, which may be implemented by the information transmitting module 250 of the SJS 114 shown in FIG. 2. The host of the host device may print out the image code and make the image code available to the public or to a selected group of users (e.g., at an event, a gathering, a party, a meeting, etc.) so that the users can access the rating interface in the SJS via the image code.

In operation 540, one or more rating inputs from the user devices are received after the user devices access the rating interface through the image code. The user input receiving module 230 of SJS 114, as shown in FIG. 2, may be programmed to receive the one or more rating inputs.

In operation 550, the received one or more rating inputs from the user devices are analyzed. The analyzing process may include a calculation process, where a score for each of the songs in the initial playlist is calculated based on the rating inputs received from two or more user devices. The analyzing process may further include a weight assignment process, where a weight is assigned to one or more particular user devices so that the rating inputs from those particular user devices are given more or less significance, as compared to other rating inputs from other user devices. In one embodiment, various different weights may be assigned to various different user devices.

In one embodiment, the analyzing of the received one or more inputs includes determining a song currently playing by the host device, determining a next song to play as identified in the adjusted playlist, and skipping the next song to play if the song currently playing by the host device is the same as the next song to play.

During the analyzing process in operation 550, an adjusted playlist is produced if the playing order of the initial playlist has been changed. The adjusted playlist producing process may be implemented by the playlist producing module 244 of the analyzing module 240, as shown in FIG. 2. The calculation process may be implemented by the calculating module 242 of the analyzing module 240, as shown in FIG. 2. As noted above, the modules defined herein are described for purposes of explaining the functionality of the systems, and more or less modules can be used to achieve the disclosed functions.

In operation 560, the produced adjusted playlist is transmitted to the host device that may play the songs in the adjusted playlist based on the playing order of the adjusted playlist. The operation 560 may be implemented by the information transmitting module 250 of the SJS 140 as shown in FIG. 2.

Although embodiments of this disclosure were described with reference to managing playlists, the disclosed technologies could also be utilized for other tasks, such as selection of mood colors for lighting a room, selection of television (TV) channels to be played during a party or gathering. Thus, any task that can have multiple options, selectable by more than one user device, can utilize the embodiments for processing rating inputs and processing adjustments to the rendering order. In one embodiment, the rating information, when obtained from multiple connected user devices, includes a crowd sourcing component. Crowd sourcing, as used herein, refers to the dynamic obtaining of data from multiple computing devices and processing of the received data to illustrate a result computed from the obtained data. Over time, the result can change dynamically as data is obtained from the connected user devices. Thus, the more user devices that provide data (i.e., input ratings), the richer that data grows, which can be processed according to a processing algorithm.

Figure 6:
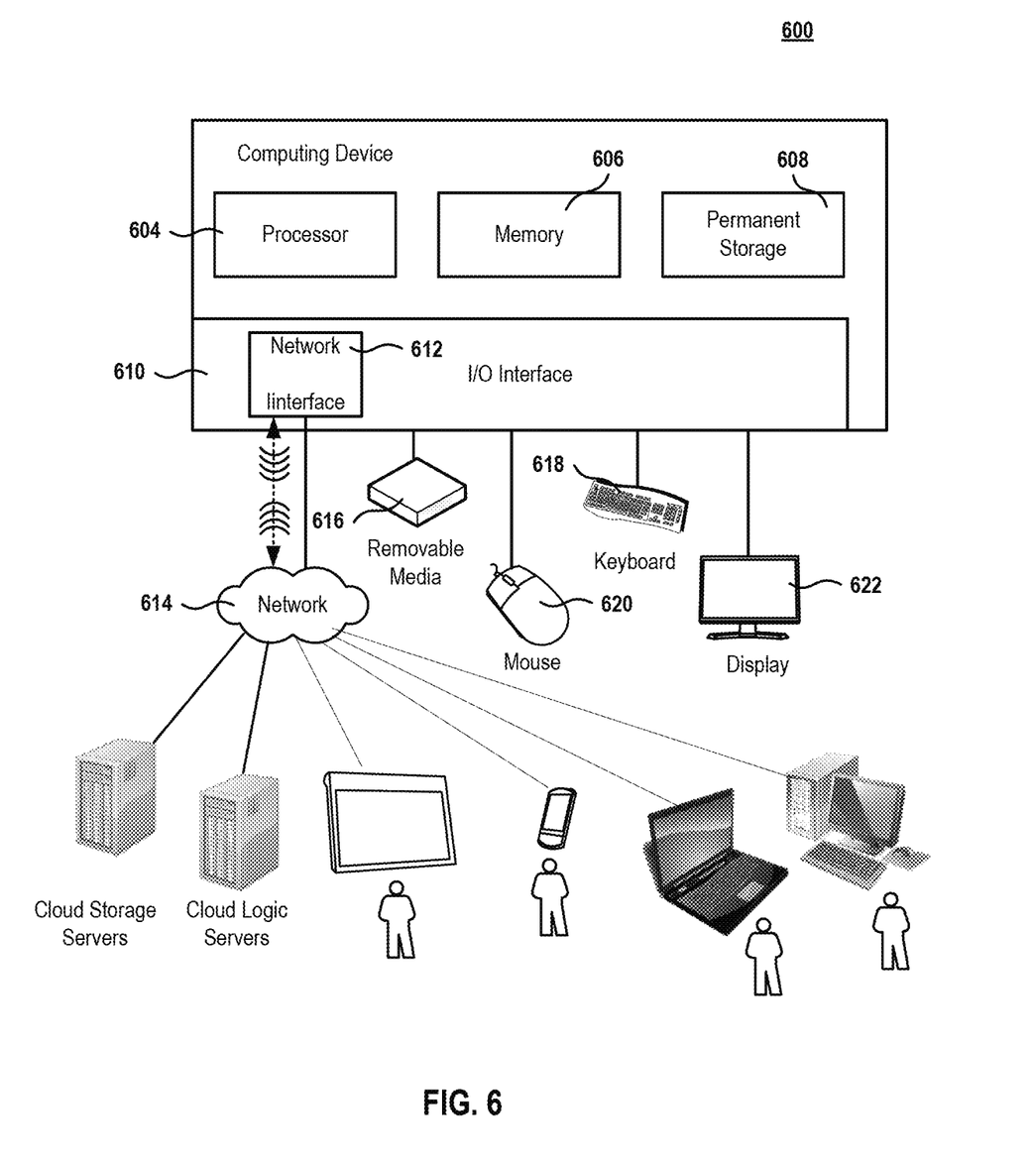
FIG. 6 is a simplified schematic diagram of a computer system for implementing embodiments of the present disclosure.

FIG. 6 is a simplified schematic diagram of a computer system 600 for implementing embodiments of the present disclosure. FIG. 6 depicts an exemplary computer environment for implementing embodiments of the disclosure. It should be appreciated that the methods described herein may be performed with a digital processing system, such as a conventional, general-purpose computer system. Special purpose computers, which are designed or programmed to perform only one function, may be used in the alternative. The computer system 600 includes a processor 604, which is coupled through a bus to memory 606, permanent storage 608, and Input/Output (I/O) interface 610.

Permanent storage 608 represents a persistent data storage device such as a hard drive or a USB drive, which may be local or remote. Network interface 612 provides connections via network 614, allowing communications (wired or wireless) with other devices. It should be appreciated that processor 604 may be embodied in a general-purpose processor, a special purpose processor, or a specially programmed logic device. Input/Output (I/O) interface 610 provides communication with different peripherals and is connected with processor 604, memory 606, and permanent storage 608, through the bus. Sample peripherals include display 622, keyboard 618, mouse 620, removable media device 616, etc.

Display 622 is configured to display the user interfaces described herein. Keyboard 618, mouse 620, removable media device 616, and other peripherals are coupled to I/O interface 610 in order to exchange information with processor 604. It should be appreciated that data to and from external devices may be communicated through I/O interface 610. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 608, network attached storage (NAS), read-only memory or random-access memory in memory module 606, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Additionally, FIG. 6 shows various types of devices that can connect to the network, such as the internet. The devices include servers, tablet computers, smartphones, laptops, desktops, etc. The various devices run operating systems and the operating systems can vary from manufacturer to manufacturer.

Some, or all operations of the method presented herein are executed through a processor, such as processor 604 of FIG. 6. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method for updating song playlists based on received user ratings, comprising:
receiving information associated with songs in an initial playlist from a host device;
generating a rating interface for the initial playlist, the initial playlist being associated with an image code, the image code being associated with an event is used to link to the rating interface for use at the event at which one or more of the songs are to be played;
sending the image code for the rating interface to the host device for physically posting at the event;
receiving one or more rating inputs from user devices, the user devices providing the one or more rating inputs after accessing the rating interface through the image code that was posted at the event;
analyzing the one or more rating inputs received from the user devices, the analyzing producing an adjusted playlist; and
transmitting the adjusted playlist to the host device, the host device providing for playing of the songs in the adjusted playlist, the method being executed by a processor.

2. The method of claim 1, wherein the information associated with the songs includes at least a song name.

3. The method of claim 1, wherein the initial playlist identifies an order for the songs as defined at the host device.

4. The method of claim 3, wherein the adjusted playlist identifies a change to the order for the songs as defined at the host device.

5. The method of claim 1, wherein the one or more rating inputs include defining a new order for the songs in the initial playlist, as received from each of the user devices.

6. The method of claim 1, wherein the analyzing of the received one or more rating inputs includes calculating a score for each of the songs in the initial playlist, the score for each of the songs being based on rating inputs received from two or more of the user devices.

7. The method of claim 6, wherein the analyzing of the received one or more rating inputs further includes assigning a weight to particular ones of the user devices so that rating inputs from the particular user devices are given more or less significance as compared to other rating inputs from other ones of the user devices.

8. The method of claim 1, wherein the analyzing of the received one or more rating inputs includes,
determining a song currently played by the host device,
determining a next song to play as identified in the adjusted playlist, and
skipping the next song to play if the song currently playing is same as the next song to play.

9. The method of claim 1, further comprising:
continuing to receive the one or more rating inputs over time, the one or more rating inputs causing the analyzing to modify the adjusted playlist.

10. The method of claim 1, further comprising:
updating the rating interface to show the adjusted playlist.

11. The method of claim 10, wherein the updating of the rating interface occurs periodically over time, or after a threshold of rating inputs is received.

12. The method of claim 1, wherein the image code is a printable pattern.

13. The method of claim 12, wherein the printable pattern is image recognizable and is configured to access a link to a website that displays the rating interface.

14. The method of claim 1, wherein the one or more rating inputs are received from the user devices located within a pre-determined range from the host device.

15. The method of claim 1, wherein the rating interface is defined by one or more user input fields.

16. The method of claim 15, wherein the rating interface further includes social network rating information about rating inputs or comments made by users for the songs in the initial playlist, the users being social network friends of a user whose user device is accessing the rating interface.

17. An apparatus for updating song playlists based on received user ratings, comprising:
- an information receiving module programmed to receive information associated with songs in an initial playlist from a host device;
- an interface generating module programmed to generate a rating interface for the initial playlist, the initial playlist being associated with an image code, the image code being associated with an event is used to link to the rating interface for use at the event at which one or more of the songs are to be played;
- an information transmitting module programmed to send the image code for the rating interface to the host device for physically posting at the event;
- a user input receiving module programmed to receive one or more rating inputs from user devices, the user devices providing the one or more rating inputs after accessing the rating interface through the image code that was posted at the event;
- an analyzing module programmed to analyze the one or more rating inputs received from the user devices to produce an adjusted playlist based on results of the analysis,
- wherein the information transmitting module is further programmed to transmit the adjusted playlist to the host device, the host device providing for playing of the songs in the adjusted playlist; and
- at least one processor configured to execute the information receiving module, the interface generating module, the information transmitting module, the user input receiving module, and the analyzing module.

18. The apparatus of claim 17, wherein the analyzing module further comprises a calculation module to be programmed to calculate a score for each of the songs in the initial playlist, the score for each of the songs being based on rating inputs received from two or more of the user devices.

19. The apparatus of claim 17, wherein the user input receiving module is further programmed to continue receiving the one or more rating inputs over time, the one or more rating inputs causing the analyzing module to modify the adjusted playlist.

20. A non-transitory computer readable medium having program instructions for updating song playlists based on received user ratings, the non-transitory computer readable medium comprising:
- program instructions for receiving information associated with songs in an initial playlist from a host device;
- program instructions for generating a rating interface for the initial playlist, the initial playlist being associated with an image code, the image code being associated with an event is used to link to the rating interface for use at the event at which one or more of the songs are to be played;
- program instructions for returning the image code for the rating interface to the host device for physically posting at the event;
- program instructions for receiving one or more rating inputs from user devices, the user devices providing the one or more rating inputs after accessing the rating interface through the image code that was posted at the event;
- program instructions for analyzing the one or more rating inputs received from the user devices, the analyzing producing an adjusted playlist; and
- program instructions for transmitting the adjusted playlist to the host device, the host device providing for playing of the songs in the adjusted playlist.

* * * * *